United States Patent [19]
Eaton et al.

[11] Patent Number: 6,003,019
[45] Date of Patent: *Dec. 14, 1999

[54] MULTI-TRANSACTION SERVICE SYSTEM

[75] Inventors: Morag M. Eaton, Fife; David Horn, Kircaldy; Ian A. Cranston; Stephen Ambler, both of Edinburgh, all of United Kingdom

[73] Assignee: NCR Corporation, Dayton, Ohio

[*] Notice: This patent is subject to a terminal disclaimer.

[21] Appl. No.: 08/886,485

[22] Filed: Jul. 1, 1997

[30] Foreign Application Priority Data

Nov. 29, 1996 [GB] United Kingdom ............... 9624894

[51] Int. Cl.$^6$ ................................................ G06F 19/00
[52] U.S. Cl. .............................. 705/42; 705/17; 705/26; 705/43
[58] Field of Search .............................. 705/17, 26, 42, 705/43; 235/379, 380, 381; 395/200.31, 200.32, 200.33, 200.47, 200.48, 200.5

[56] References Cited

U.S. PATENT DOCUMENTS

| | | | |
|---|---|---|---|
| 5,239,480 | 8/1993 | Huegel | 705/5 |
| 5,650,604 | 7/1997 | Marcous et al. | 235/379 |
| 5,682,482 | 10/1997 | Burt et al. | 705/42 |
| 5,787,403 | 7/1998 | Randle | 705/43 |

OTHER PUBLICATIONS

PR Newswire Association Inc., "NCR Releases Architecture Base for Future Model of Computing—Open Cooperative Computing Architecture—", Feb. 12, 1990.

Entersoft White Paper on NCR Top End, section entitled, "The Industry on Top End", Feb. 4, 1996.

Primary Examiner—Emanuel Todd Voeltz
Assistant Examiner—John V. Hayes
Attorney, Agent, or Firm—George H. Gates

[57] ABSTRACT

A customer (80) can request and receive a financial service through any of a number of channels (82,83,84,85,86,87), each connected to channel-specific hardware, respectively a digital telephone (92), an ATM (93), a branch office (94), a branch sales office (99), a self service sales terminal (95), a home banking PC (96) and an interactive television (97). Each service channel is connected through an integrated channel manager (100) to business operations means including a transaction processing host computer (112), a cheque processor (113), a relationship database manager (114), a financial call center (115), and an external financial database (111). The ICM 100 provides interfaces for each channel and each business operation means so far as the channel-specific and business operation-specific aspects are concerned, and also runs a number of business application services (142, 144, 146, 148), such as a balance inquiry service, which can interface with any channel and any business operation means independently of any channel-specific or operation-specific requirements.

16 Claims, 3 Drawing Sheets

MULTI-TRANSACTION SERVICE SYSTEM

BACKGROUND OF THE INVENTION

This invention relates to a system for the supply of multi-transaction services, such as a financial services systems, a retail services system, or a communications system. The common factor is that each system is transaction-intensive and channel-specific, i.e. provides a substantial number of simultaneous service transactions through service-specific hardware and software channels.

In a multi-transaction financial services systems, a wide range of financial services is available through a variety of different delivery channels. Examples include a telephone call to a financial institution such as a Bank to inquire about a customer balance; a withdrawal of cash from an Automated Teller Machine(ATM), and use of electronic point of sale (POS) equipment. Each service is provided by service-specific hardware and software, i.e. a service-specific delivery channel, and each channel requires a specific connection to each possible host.

It is a disadvantage of such service-specific delivery channels that the services are difficult to expand or enhance, and difficult to maintain and control. It is a further disadvantage that potentially valuable information about customer activities and behavior is not easy to correlate across the channels, and much of the information can be regarded as "lost".

While the desirability of an integrated system having a number of different channels and capturing all customer information has been recognized for several years, no method of implementing such integration has previously been disclosed.

SUMMARY OF THE INVENTION

It is the object of the invention to provide a multi-transaction service system which does not suffer from the disadvantages of known arrangements of a separate delivery channel for each service.

According to the invention there is provided a multi-transaction services system characterized by comprising a plurality of service request and supply channels each comprising channel-specific hardware and software; at least one operation means comprising operation-specific hardware and software; and connected between said channels and said operation means an integrated channel manager arranged to provide a first interface layer arranged to interface the channel-specific components of each channel; a second interface layer to interface said operation means; and between the first and second interface layers a third layer comprising at least one application service connectable to any channel in a channel-independent manner.

Preferably the system is a multi-transaction financial services system in which the channels comprises a plurality of financial service channels; the operation means comprise a plurality of financial service operation means, and the application services comprise business application services such as a balance inquiry, an account credit, an account debit, a cash deposit, a cash withdrawal, a cheque deposit a cheque withdrawal, a loan inquiry, a mortgage inquiry, an insurance inquiry, and the like.

DETAILED DESCRIPTION

Figure 1:
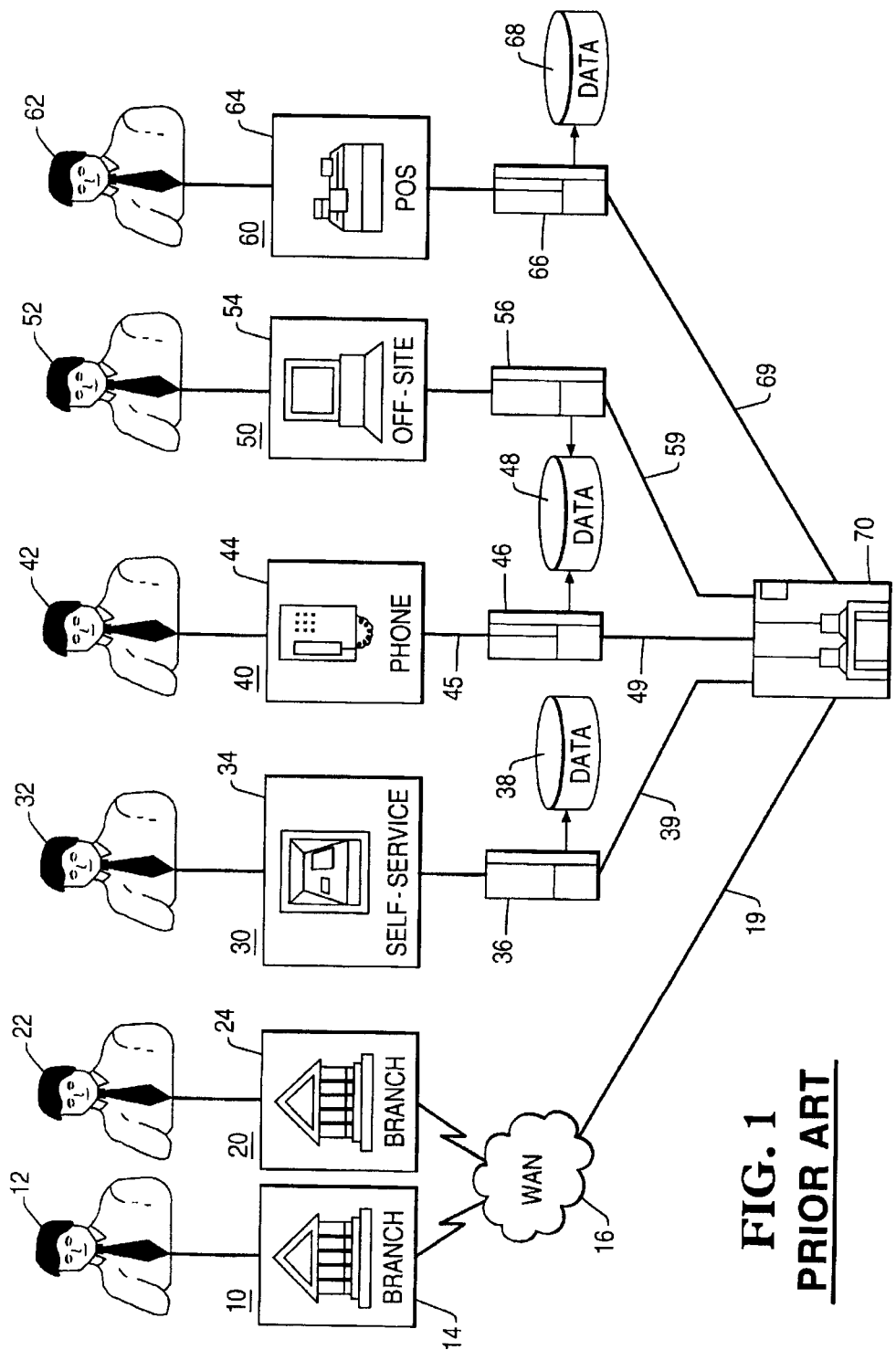
FIG. 1 illustrates a prior art system.

In the prior art it is known to provide a plurality of financial services through different hardware and software channels all connected to a data host. FIG. 1 shows six typical channels, 10, 20, 30, 40, 50 and 60. In channel 10, a customer 12 visits the premises of a Bank 14, and interacts with a human cashier (not shown) for example to withdraw or deposit cash. The financial transaction details are transmitted from the bank 14 through a wide area network (WAN) 16 having a data link 19 to a transaction data host 70, i.e. a central computer. Channel 20 is similar, the customer 22 visits a bank 24 and a transaction is recorded in the data host 70 through the WAN 16 and data link 19.

In Channel 30 a customer 32 visits a self-service financial terminal such as an ATM 34. The ATM is connected by a server 36 to a local database 38 arranged to authorize and control a transaction such as a request to withdraw cash. The transaction details are sent to the data host 70 by a data link 39. In channel 40 a customer 42 uses a digital telephone (or touch-tone telephone) 44 and the public switched telephone network (PSTN) 45 to initiate a transaction, such as a balance inquiry or transfer of funds between accounts; the transaction can be based on a voice prompt system, with the customer 42 keying in the appropriate response by number on the telephone 44. The PSTN 45 connects through a server 46 to a local database 48 arranged to authorize and control the transaction, and the details are sent to the data host 70 by a data link 49. Channel 50 is similar, but the customer 52 uses a home computer 54 to connect to a server 56, which is connected to the local database 48, and by a datalink 59 to the data host 70.

In channel 60, a customer 62 is involved in a point-of-sale (POS) transaction at a POS terminal 64 which is connected to a server 66 and local database 68. The server 66 is connected to the host 70 by a data link 69.

Clearly, the service channels 10 to 60 are independent, are different in nature, and each involve separate and distinct hardware running software specific to that hardware and that channel. Historically, each type of channel was developed at a different date, often as an "add-on" service. As each new channel was developed, it was essential to arrange it so that existing channels were not overloaded or otherwise affected, and therefore separate local databases 38, 48, 68 were provided.

It is also clear that correlation of inputs across all of the channels is not easy, so that it is difficult to make customer information from one channel available through another channel.

For example the local databases 38, 48, 68, supply the data host 70 only with relevant information. The database 68 associated with the POS channel 60 may record the information "Mr. Smith ordered a washing machine costing £1,000", but it will send to the data host 70 "Debit Mr. Smith's account by £1,000". The detailed customer information has been lost, and there is no means within the system for recognizing that Mr. Smith may require insurance for the washing machine and therefore the opportunity of offering him this financial service has been lost.

Figure 2:
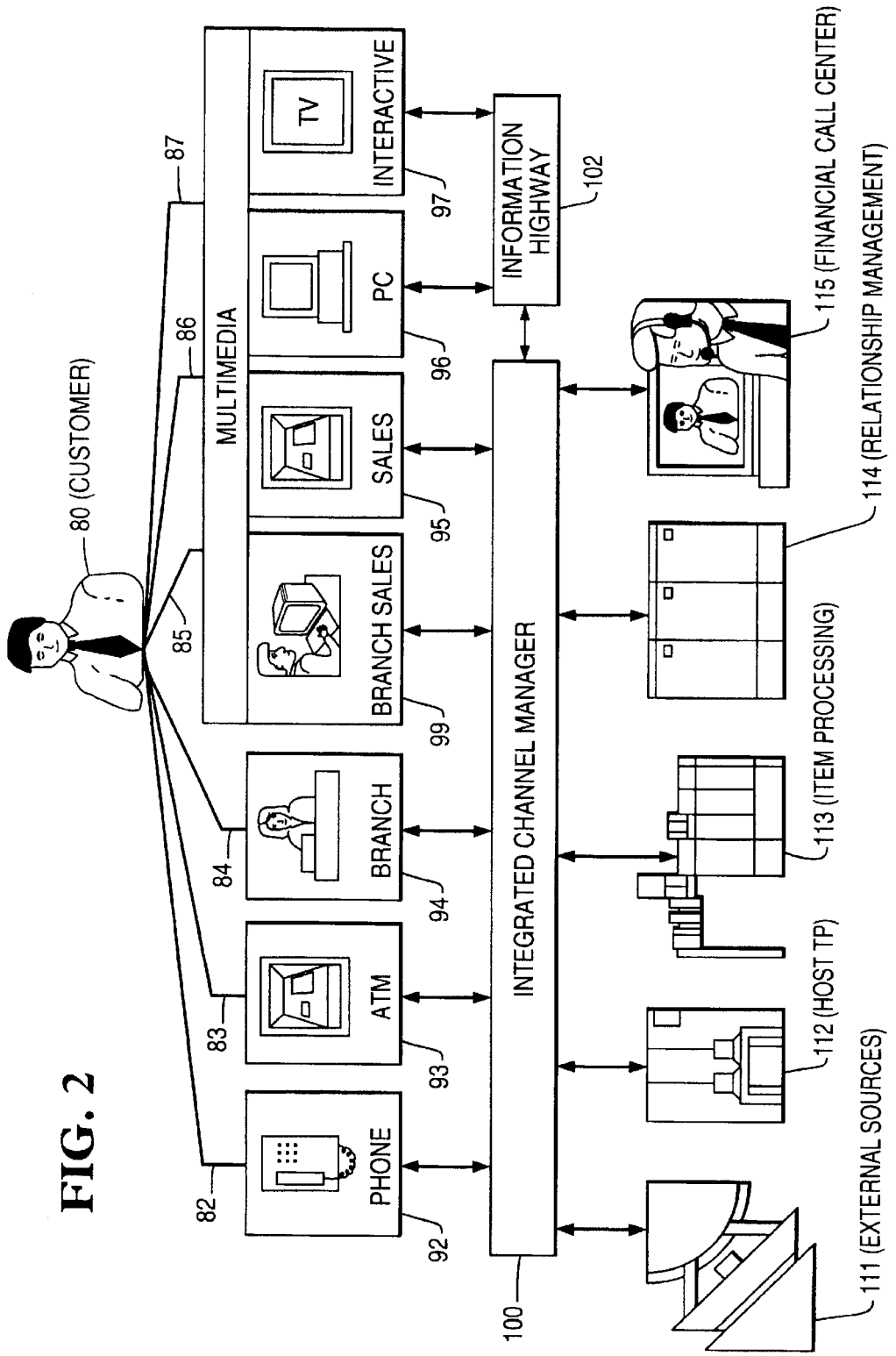
FIG. 2 illustrates an integrated financial services system according to the invention.

In the integrated financial services system according to the invention, shown in FIG. 2, a customer 80 interacts by channels 82, 83, 84, 85, 86, 87 with a number of services.

Some of the services shown are identical to those in FIG. 1, e.g. channel 82 allows a digital telephone 92 to be used for a balance inquiry or an account-to-account transfer of funds; channel 83 provides a service through an ATM 93; channel 84 indicates a visit by the customer to bank premises 94; and channel 86 shows the use of a home banking system running on a PC 96.

Three channels are additional to those shown in FIG. 1; channel 85 shows an automated sales terminal 95, which can be arranged to sell tickets for travel or entertainment or insurance or the like on a self service basis; channel 87 provides an interactive service by means of a television receiver 97; an additional facility is the opportunity for branch sales 99, such as the offer to the customer 80 of a financial service or product such as insurance from the local bank branch.

The hardware and software associated with channels 82, 83, 84 and 85, of the branch sales facility 99 are connected directly to an integrated channel manager ICM 100. The hardware and software of the channels 86 and 87 are connected through an information highway 102, such as a wide area network or the World Wide Web to the ICM 100.

A number of business service operation means are shown in FIG. 2, i.e. a transaction processing host computer 112, on which all financial transactions running in the system are recorded; an item processor such as a cheque processor 113; a relationship management database 114 on which customer details such as income, expenditure, recent purchases etc. are recorded and classified; and a financial call center 115 from which telephone calls can be made to any customer of the financial institution running the system to offer a new service or a financial service suggested by e.g. a recent purchase. Each operation means 112, 113, 114, 115 is connected to the ICM 100. There is also provision for connection to an external data source 111, such as a record of stocks and shares and price movements of those stocks and shares.

Figure 3:
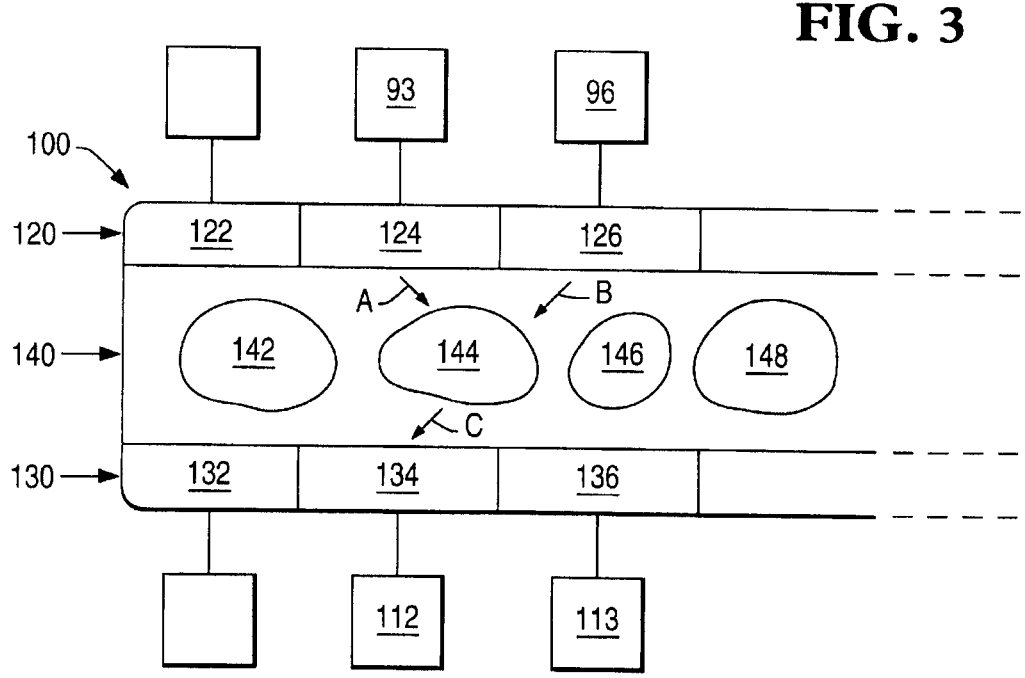
FIG. 3 illustrates the integrated channel manager schematically.

The arrangement of the ICM 100 is shown in highly schematic form in FIG. 3. The ICM can be regarded as having three layers; a first outer layer 120 has a number of service channel interfaces 122, 124, 126 etc., one for each customer service channel, such as connection to the ATM 93 or the home computer 96. A second outer layer 130 has a number of business operation interfaces 132, 134, 136 etc., one for each business operation means, such as connection to the transaction processing host computer 112 or the cheque processor 113.

Each of the outer layers 120, 130 is organized so that each interface within it manages the channel-specific aspects of the hardware and software running the customer service channel or business service operation to which that interface is connected.

Between the outer layers is a third layer 140 which supports and executes a number of business application functions 142, 144, 146, 148, such as a balance inquiry, an account credit, an account debit, a cash deposit, a cash withdrawal, a cheque deposit, a cheque withdrawal, a loan inquiry, a mortgage inquiry, or an insurance inquiry, e.g. for a house, a car, a boat etc. An alternative name for a business application function is a business object. The common factor of all the business application functions or business objects is that the functions are channel-independent. Further any service can access any business application function which can provide information accessed in any business service operation.

This arrangement of the ICM 100 allows the access to every business application function to be channel-independent, both from the customer delivery channel point of view and the business operation means point of view, while the channel-specific parts of interaction with each customer delivery channel or business operations means are managed by the outer layers 120, 130 of the ICM 100.

For example, suppose business application function 144 is a balance inquiry. This can be initiated from ATM 93 or a computer 96 through the interfaces 124 or 126 respectively, and the data needed to answer the inquiry resides on the host computer 112 connected through the interface 134.

The ICM 100 routes a balance inquiry from either the ATM 93 or the home computer 96 to the balance inquiry function 144 as shown by the arrows A, B and connects the function 144 to the host computer 112 as shown by arrow C. The balance information is returned through the reverse route.

The ICM 100 is arranged so that the function 144 is unaware of the customer service channel originating the call, i.e. is unaware of its channel-specific hardware and software systems, but the customer service channel receives the information in the appropriate format. Similarly, the data host 112 is unaware of the business application function to which it is providing data, but that data is supplied to the business function in the appropriate format, and is not dependent on the hardware or software systems of the data host. In other words, the complexity of accessing multiple hosts from different service delivery channels is hidden by the ICM.

Figure 4:
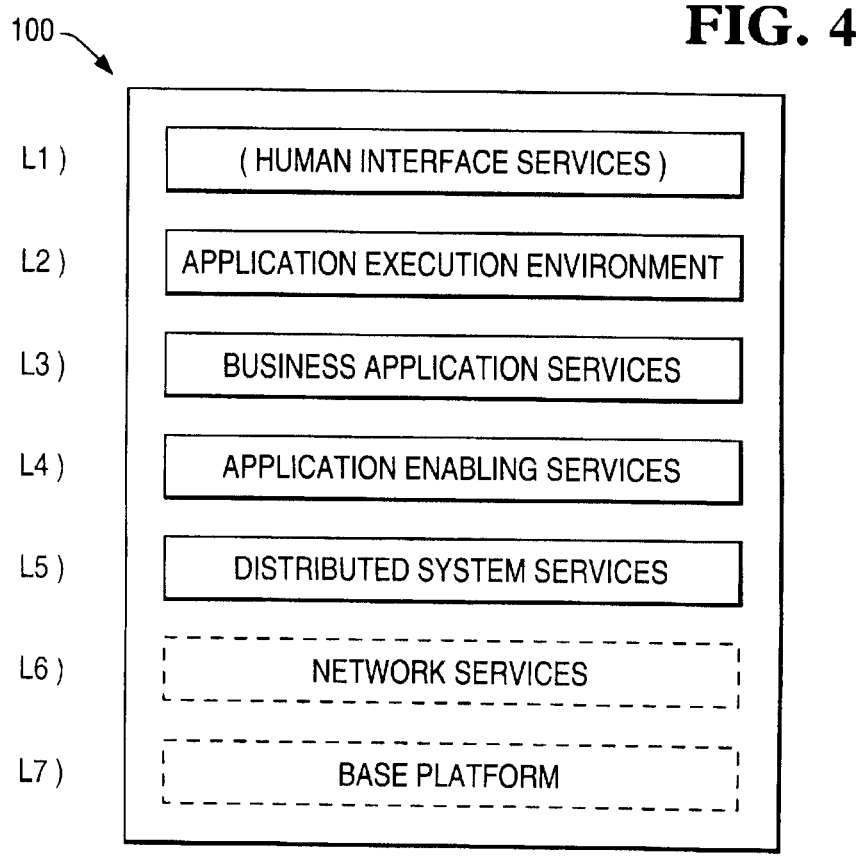
FIG. 4 illustrates the architecture of a part of the system of FIG. 2.

The arrangement illustrated in FIG. 3 is schematic only. The required separation of channel-specific and channel-independent features of the system is achieved by reason of the novel architecture of the ICM 100 which is shown in FIG. 4.

The architecture comprises seven layers L1–L7 as shown, and the arrangement is a variation of the NCR Open Co-operative Computing Architecture described in the "Knowledge Center" at http://www.tkc.nrc.com Under "Products and Systems" select "Architecture (OCCA)"

The layer L1 provides interfaces for the customer 80 through any customer service channel 82–87 and is the Human Interface Service layer. Each interface is channel-specific, as described above, but in layer L1 each channel has end points at which the services of that channel are mapped, thereby defining certain channel specific features. Layer L1 does not provide access to the application services of layer L2. Layer L1 however provides access to the operation, administration and maintenance of the service requests.

Layer L2, the Application Execution Layer, monitors the execution of the business application services in layer L3, including start-up and monitoring of each application. For example, referring again to FIG. 3, if the balance inquiry function 144 failed, then layer L2 would attempt to re-start it.

Layers L4 and L5 provide respectively application enabling services and distributed system services; layers L2, L4 and L5 may comprise in NCR's "Top End" middleware, described on the World Wide Web at address http://www.ncr.com/product/topend.

Layer L6 provides network services such as connections to geographically separated parts of the system, and layer L7 is the base platform, is the hardware and operating software layer, which may for example be Intel processors running the NCR Unix operating system.

Layer L3, Business Application Services, interacts with the Top End middleware of layers L2, L4 and L5, the architecture overall operating as described with respect to FIG. 3 to provide channel specific interface layers 120, 130 to a number of business application functions.

The financial services provided by the system of Fig. can now be regarded as service oriented, rather than channel oriented as in the prior art. For example, if the customer 80 requires a cash withdrawal, the ICM 100 regards this as "a cash withdrawal service", which may be initiated by an ATM 93 or at a bank branch 94 etc.; in the prior art arrangement there would have been "an ATM service" or "a bank branch service".

The provision of the integrated channel manager 100 in effect draws together all the disparate sources of customer contact and information in a financial services environment. Information about a customer 80 is connected through all of the channels 82–87, and is made available by the ICM 100 to all of the business service operation means 111–115. The business services therefore have access to the customers contact history (e.g. the customer's entire use of ATMs, home banking systems, visits to a bank branch etc. which were previously logged only on a channel-specific basis); customer contact management (e.g. use of the collected customer history to offer services); and customer complaint handling (has the customer made a complaint? How was it handled? In what circumstances is it likely to recur?). The information can be used to provide targeted marketing through any channel the customer uses to access a service, i.e. the customer can be provided with details of financial products and services most likely to be attractive to the customer, given the customers' financial background and habits.

For example if a customer makes a major purchase, an offer of an appropriate insurance may be made by the financial call center 115. If the customer owns stocks and shares, information from the external database 111 can be used to initiate an offer of further shares as an advantageous share price is noted.

Similarly, the customer 80 has access to all of the business services by any channel, subject to restrictions placed by the financial institution, or on physical restrictions (e.g. it is still not possible to withdraw cash over the telephone, although loading of an electronic purse is a possibility).

It is a further advantage of this system according to the invention that new services can be added quickly and easily. For example, if the financial institution decides to add a car insurance scheme to its portfolio of financial products, then a central car insurance service may be added which may define the data to be collected and its validation and storage. This component is channel independent. The service can then be pulled into each suitable delivery channel 82–87 as appropriate. Initially a user interface may be added to the call center 115 where data is entered by a call center agent, with the ICM 100 handling the interface between the call center and car insurance service. Later, a similar upgrade may be applied to self-service terminals 93,95 with no impact on the use of the service by the call center or the car insurance service itself.

Such additions of new services can be supported without shutting down the existing system, and services can be moved physically within the system environment without change to or impact on the existing channels.

The separation of business functionality from delivery channels can be applied in systems other than financial service systems. The invention can also be applied in the retail system, in which the customer service channels will include a Point Of Sale till, an automatic vending machine, and a loyalty card processing terminal, and the operation means will include a relationship manager to provide a base for customer services such as special offers, posting of coupons to selected addresses etc. Also, in a communications system, the customer service channels will include conventional telephone, cable television and interactive television facilities.

What is claimed is:

1. A multi-transaction services system comprising:
   a plurality of service request and supply channels, each channel including channel-specific hardware and software;
   at least one operation means including operation-specific hardware and software; and
   an integrated channel manager connected between the channels and the operation means, the integrated channel manager having (i) a first interface layer for interfacing the channel-specific components of each channel, (ii) a second interface layer for interfacing the operation means, and (iii) a third interface layer between the first and second interface layers and including at least one application service connectable to any channel in a channel-independent manner for performing one or more channel-independent functions using data supplied by the operations means, wherein the operations means is unaware of the function being performed by application service.

2. A multi-transaction services system according to claim 1, wherein (i) the plurality of channels comprise financial service channels, (ii) the operation means comprises a plurality of financial service operations means, and (iii) the application service comprises a plurality of business application services.

3. A multi-transaction services system according to claim 2, wherein the business application services comprise at least one of a balance inquiry, an account credit, an account debit, a cash deposit, a cash withdrawal, a cheque deposit, a cheque withdrawal, a loan inquiry, a mortgage inquiry, and an insurance inquiry.

4. A multi-transaction services system according to claim 2, wherein the financial service channels comprise at least one of an automated teller machine, a self service sales terminal, a home banking system, a digital telephone connection, a financial services branch office, a financial branch sales office, and an interactive television system.

5. A multi-transaction services system according to claim 2, wherein the operations means comprise at least one of a transaction processing host computer, an item processor, a relationship management database, a financial call center, and an external financial database.

6. A multi-transaction services system according to claim 2, wherein the integrated channel manager includes:
   a first layer (L1) for receiving customer requests for a plurality of different channel-specific financial services and providing access to the operation, administration, and maintenance of the service requests;
   a second layer (L2) for monitoring the operation of the business application services;
   a third layer (L3) for providing interfaces between the plurality of channel-specific services and the plurality of financial service operation means, and providing the business application services;
   a fourth layer (L4) for providing application enabling services; and
   a fifth layer (L5) for providing distributed system services.

7. A multi-transaction services system according to claim 6, wherein the second, fourth, and fifth layers (L2, L4, L5) comprise the middleware NCR Top End.

8. A multi-transaction services system according to claim 1, wherein (i) the plurality of channels comprise retail service channels including at least two of a point of sale service, an automatic vending service, and a loyalty card service, and (ii) the operation means comprises at least a relationship database.

9. A method for providing multi-transaction services, comprising:

connecting an integrated channel manager between a plurality of service request and supply channels and at least one operations means, wherein each channel includes channel-specific hardware and software and the operation means includes operation-specific hardware and software;

providing a plurality interface layers in the integrated channel manager for the connected channels and the connected operation means, the provided interface layers comprising (i) a first interface layer for interfacing the channel-specific components of each channel, (ii) a second interface layer for interfacing the operation means, and (iii) a third interface layer between the first and second interface layers and including at least one application service connectable to any channel in a channel-independent manner for performing one or more channel-independent functions using data supplied by the operations means, wherein the operations means is unaware of the function being performed by application service.

10. A method of providing multi-transaction services according to claim 9, wherein (i) the plurality of channels comprise financial service channels, (ii) the operation means comprises a plurality of financial service operations means, and (iii) the application service comprises a plurality of business application services.

11. A method of providing multi-transaction services according to claim 10, wherein the business application services comprise at least one of a balance inquiry, an account credit, an account debit, a cash deposit, a cash withdrawal, a cheque deposit, a cheque withdrawal, a loan inquiry, a mortgage inquiry, and an insurance inquiry.

12. A method of providing multi-transaction services according to claim 10, wherein the financial service channels comprise at least one of an automated teller machine, a self service sales terminal, a home banking system, a digital telephone connection, a financial services branch office, a financial branch sales office, and an interactive television system.

13. A method of providing multi-transaction services according to claim 10, wherein the operations means comprise at least one of a transaction processing host computer, an item processor, a relationship management database, a financial call center, and an external financial database.

14. A method of providing multi-transaction services according to claim 10, wherein the integrated channel manager includes: a first layer (L1) for receiving customer requests for a plurality of different channel-specific financial services and providing access to the operation, administration, and maintenance of the service requests; a second layer (L2) for monitoring the operation of the business application services; a third layer (L3) for providing interfaces between the plurality of channel-specific services and the plurality of financial service operation means, and providing the business application services; a fourth layer (L4) for providing application enabling services; and a fifth layer (L5) for providing distributed system services.

15. A method of providing multi-transaction services according to claim 14, wherein the second, fourth, and fifth layers (L2, L4, L5) comprise the middleware NCR Top End.

16. A method of providing multi-transaction services according to claim 9, wherein (i) the plurality of channels comprise retail service channels including at least two of a point of sale service, an automatic vending service, and a loyalty card service, and (ii) the operation means comprises at least a relationship database.

* * * * *

(12) EX PARTE REEXAMINATION CERTIFICATE (8633rd)
United States Patent
Eaton et al.

(10) Number: US 6,003,019 C1
(45) Certificate Issued: Oct. 25, 2011

(54) MULTI-TRANSACTION SERVICE SYSTEM

(75) Inventors: Morag M. Eaton, Fife (GB); David Horn, Kircaldy (GB); Ian A. Cranston, Edinburgh (GB); Stephen Ambler, Edinburgh (GB)

(73) Assignee: NCR Corporation, Dayton, OH (US)

Reexamination Request:
No. 90/009,191, Jun. 18, 2008

Reexamination Certificate for:
Patent No.: 6,003,019
Issued: Dec. 14, 1999
Appl. No.: 08/886,485
Filed: Jul. 1, 1997

(51) Int. Cl.
*G06Q 20/00* (2006.01)
*G07F 19/00* (2006.01)

(52) U.S. Cl. .................... 705/42; 705/17; 705/43
(58) Field of Classification Search .................. None
See application file for complete search history.

(56) References Cited

FOREIGN PATENT DOCUMENTS

WO     WO 94/15294     7/1994

*Primary Examiner* — Peter C. English

(57) ABSTRACT

A customer (80) can request and receive a financial service through any of a number of channels (82,83,84,85,86,87), each connected to channel-specific hardware, respectively a digital telephone (92), an ATM (93), a branch office (94), a branch sales office (99), a self service sales terminal (95), a home banking PC (96) and an interactive television (97). Each service channel is connected through an integrated channel manager (100) to business operations means including a transaction processing host computer (112), a cheque processor (113), a relationship database manager (114), a financial call center (115), and an external financial database (111). The ICM 100 provides interfaces for each channel and each business operation means so far as the channel-specific and business operation-specific aspects are concerned, and also runs a number of business application services (142, 144, 146, 148), such as a balance inquiry service, which can interface with any channel and any business operation means independently of any channel-specific or operation-specific requirements.

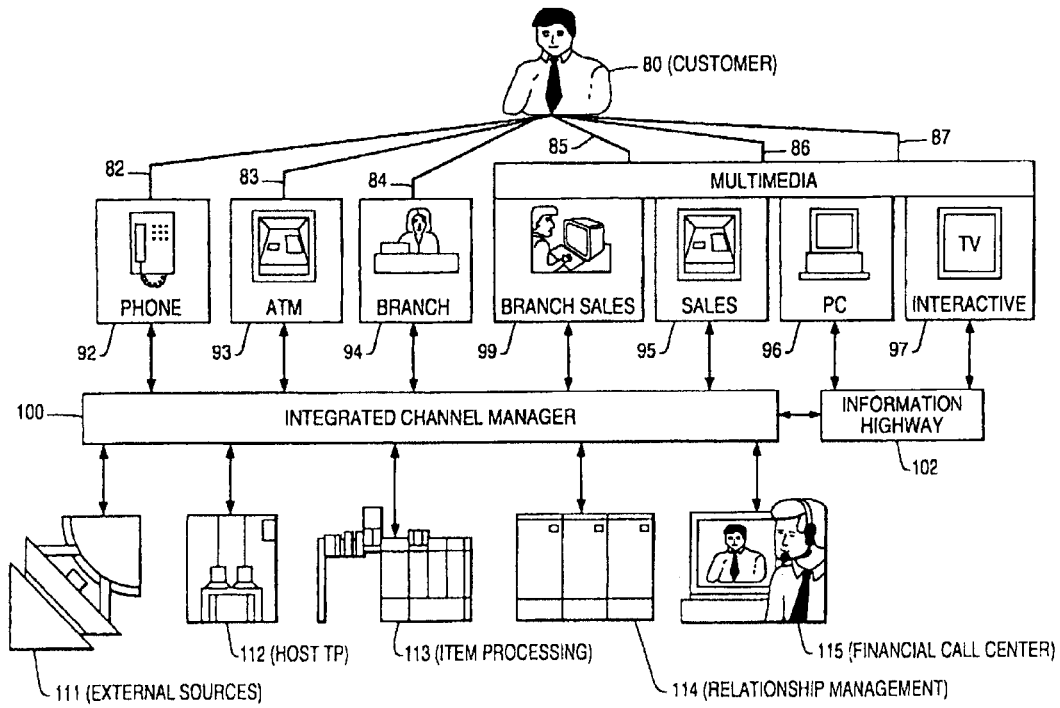

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 9 are cancelled.

New claims 17 and 18 are added and determined to be patentable.

Claims 2–8 and 10–16 were not reexamined.

*17. A multi-transaction services system according to claim 1 wherein the at least one application service comprises a plurality of banking application services which comprise at least one of a balance inquiry, an account credit, an account debit, a cash deposit, a cash withdrawal, a cheque deposit, and a cheque withdrawal.*

*18. A multi-transaction services system according to claim 17 wherein the plurality of channels comprise financial service channels, and the financial service channels comprise at least an automated teller machine and a self service sales terminal.*

\* \* \* \* \*